United States Patent
Zhou

(10) Patent No.: US 12,238,406 B2
(45) Date of Patent: Feb. 25, 2025

(54) OBJECT DISPLAY METHOD AND ELECTRONIC DEVICE

(71) Applicant: VIVO MOBILE COMMUNICATION CO., LTD., Dongguan (CN)

(72) Inventor: Ming Zhou, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 318 days.

(21) Appl. No.: 17/751,639

(22) Filed: May 23, 2022

(65) Prior Publication Data

US 2022/0286622 A1 Sep. 8, 2022

Related U.S. Application Data

(63) Continuation of application No. PCT/CN2020/131166, filed on Nov. 24, 2020.

(30) Foreign Application Priority Data

Nov. 25, 2019 (CN) .......................... 201911167320.5

(51) Int. Cl.
*H04N 23/63* (2023.01)
*G06F 3/04845* (2022.01)
(Continued)

(52) U.S. Cl.
CPC ....... *H04N 23/631* (2023.01); *G06F 3/04845* (2013.01); *G06V 20/30* (2022.01);
(Continued)

(58) Field of Classification Search
CPC ...... H04N 23/45; H04N 23/61; H04N 23/611; H04N 23/62; H04N 23/631; H04N 23/632;
(Continued)

(56) References Cited

U.S. PATENT DOCUMENTS

2014/0104376 A1  4/2014 Chen
2017/0085790 A1  3/2017 Bohn
(Continued)

FOREIGN PATENT DOCUMENTS

CN    102148965 A   8/2011
CN    105469029 A   4/2016
(Continued)

OTHER PUBLICATIONS

Extended European Search Report issued in related European Application No. 20891642.9, mailed Jan. 2, 2023, 10 pages.
(Continued)

*Primary Examiner* — Daniel M Pasiewicz
(74) *Attorney, Agent, or Firm* — IPX PLLC

(57) ABSTRACT

An object display method includes: obtaining a second image in a case that a first image is displayed, where the first image is an image acquired by a first camera, the second image is an image acquired by a second camera, each of the first image and the second image includes a plurality of objects, the plurality of objects are images of a plurality of first physical objects, and resolution of the second image is greater than that of the first image; displaying, in the first image according to the second image, at least one identifier for indicating M target object(s) in the plurality of objects in the first image, where M is a positive integer; receiving a first input for a first object in the M target object(s) in the first image; and magnifying display of a first object in the second image in response to the first input.

20 Claims, 7 Drawing Sheets

(51) Int. Cl.
*G06V 20/30* (2022.01)
*H04N 23/45* (2023.01)
*H04N 23/61* (2023.01)
*H04N 23/62* (2023.01)

(52) U.S. Cl.
CPC ............. *H04N 23/45* (2023.01); *H04N 23/61* (2023.01); *H04N 23/62* (2023.01); *H04N 23/633* (2023.01); *G06F 2203/04805* (2013.01); *G06F 2203/04806* (2013.01)

(58) Field of Classification Search
CPC ...... H04N 23/57; H04N 23/633; H04N 23/69; H04N 23/667; G06V 20/30; G06F 3/04845; G06F 2203/04805; G06F 2203/04806
See application file for complete search history.

(56) References Cited

U.S. PATENT DOCUMENTS

| | | | |
|---|---|---|---|
| 2018/0196472 A1 | 7/2018 | Lee | |
| 2019/0082101 A1* | 3/2019 | Baldwin | ................ H04N 23/45 |
| 2020/0382725 A1* | 12/2020 | Gao | ....................... H04N 23/61 |

FOREIGN PATENT DOCUMENTS

| | | |
|---|---|---|
| CN | 106131397 A | 11/2016 |
| CN | 106791378 A | 5/2017 |
| CN | 106791400 A | 5/2017 |
| CN | 108353126 A | 7/2018 |
| CN | 108604373 A | 9/2018 |
| CN | 109495616 A | 3/2019 |
| CN | 110072070 A | 7/2019 |
| CN | 110301136 A | 10/2019 |
| CN | 110493454 A | 11/2019 |
| CN | 110913132 A | 3/2020 |
| CN | 110944113 A | 3/2020 |
| JP | 2019161534 A | 9/2019 |
| JP | 2009284075 A | 12/2019 |
| KR | 20190028349 A | 3/2019 |
| WO | 2018152437 A1 | 8/2018 |
| WO | 2019042419 A1 | 3/2019 |
| WO | 2019124824 A1 | 6/2019 |

OTHER PUBLICATIONS

Examination Report issued in related Indian Application No. 202217035657, mailed Mar. 6, 2023, 7 pages.
International Search Report issued in corresponding International Application No. PCT/CN2020/131166, mailed Feb. 22, 2021, 5 pages.
First Office Action issued in related Chinese Application No. 201911167320.5, mailed Oct. 21, 2020, 9 pages.
Office Action issued in related Korean Application No. 10-2022-7021130, mailed Oct. 19, 2023, 5 pages.

* cited by examiner

OBJECT DISPLAY METHOD AND ELECTRONIC DEVICE

CROSS-REFERENCE TO RELATED APPLICATIONS

This application is a continuation of International Application No. PCT/CN2020/131166, filed on Nov. 24, 2020, which claims the priority to Chinese Patent Application No. 201911167320.5, filed on Nov. 25, 2019. The entire contents of each of the above-identified applications are expressly incorporated herein by reference.

TECHNICAL FIELD

Embodiments of the present disclosure relate to the field of communications technologies, and in particular, to an object display method and an electronic device.

BACKGROUND

As the intelligence of electronic devices keep increasing, application programs in the electronic devices have more and more functions.

A gallery application program (referred to as a gallery application below) in an electronic device is used as an example. Currently, when a user views a photo through the gallery application, if the user needs to view a magnified display effect of an object in the photo, the user may perform an input for the object to trigger the electronic device to magnify display of the object for the user to view the magnified display effect of the object.

However, in the above process, after the electronic device magnifies display of an object, the image resolution of the object decreases, leading to a poor display effect when the electronic device magnifies the display of the object.

SUMMARY

Embodiments of the present disclosure provide an object display method and an electronic device.

According to a first aspect, embodiments of the present disclosure provide an object display method. The method is applied to an electronic device. The method includes: obtaining a second image in a case that a first image is displayed; displaying at least one identifier in the first image according to the second image; then receiving a first input for a first object in M target object(s) in the first image; and magnifying display of a first object in the second image in response to the first input. The first image is an image acquired by a first camera, the second image is an image acquired by a second camera, each of the first image and the second image includes a plurality of objects, the plurality of objects are images of a plurality of first physical objects, and resolution of the second image is greater than that of the first image. The at least one identifier is used for indicating the M target object(s) in the plurality of objects in the first image, and M is a positive integer.

According to a second aspect, the embodiments of the present disclosure provide an electronic device. The electronic device may include an obtaining module, a processing module, and a receiving module. The obtaining module is configured to obtain a second image in a case that a first image is displayed, where the first image is an image acquired by a first camera, the second image is an image acquired by a second camera, each of the first image and the second image includes a plurality of objects, the plurality of objects are images of a plurality of first physical objects, and resolution of the second image is greater than that of the first image. The processing module is configured to display at least one identifier in the first image according to the second image obtained by the obtaining module, where the at least one identifier is used for indicating M target object(s) in the plurality of objects in the first image, and M is a positive integer. The receiving module is configured to receive a first input by a user for a first object in the M target object(s) in the first image displayed by the processing module. The processing module is further configured to magnify display of a first object in the second image in response to the first input received by the receiving module.

According to a third aspect, the embodiments of the present disclosure provide an electronic device. The electronic device includes a processor, a memory, and a computer program stored in the memory and runnable on the processor, where when the computer program is executed by the processor, the steps of the foregoing object display method in the first aspect are implemented.

According to a fourth aspect, the embodiments of the present disclosure provide a non-transitory computer-readable storage medium, storing a computer program, where when the computer program is executed by a processor, the steps of the foregoing object display method in the first aspect are implemented.

In the embodiments of the present disclosure, in a case that an electronic device displays a first image that is acquired by a first camera and includes a plurality of objects, the electronic device may obtain a second image that is acquired by a second camera and includes the plurality of objects (the plurality of objects are images of a plurality of first physical objects, and resolution of the second image is greater than that of the first image). In addition, the electronic device may display, in the first image according to the second image, at least one identifier for indicating M (M is a positive integer) target objects in the plurality of objects in the first image. Then the electronic device may receive a first input by a user for a first object in the M target object(s) in the first image. The electronic device magnifies display of a first object in the second image in response to the first input. By means of the solution, if the user needs to view a magnified display effect of a target object in the plurality of objects in the first image, the electronic device may obtain the second image that includes the plurality of objects, and magnify display of the target object in the second image. Resolution of the second image is greater than that of the first image. Therefore, when the electronic device magnifies the display of the target object in the second image, it can be ensured that the electronic device magnifies the display of the target object with an adequate display effect.

DETAILED DESCRIPTION

Figure 1:
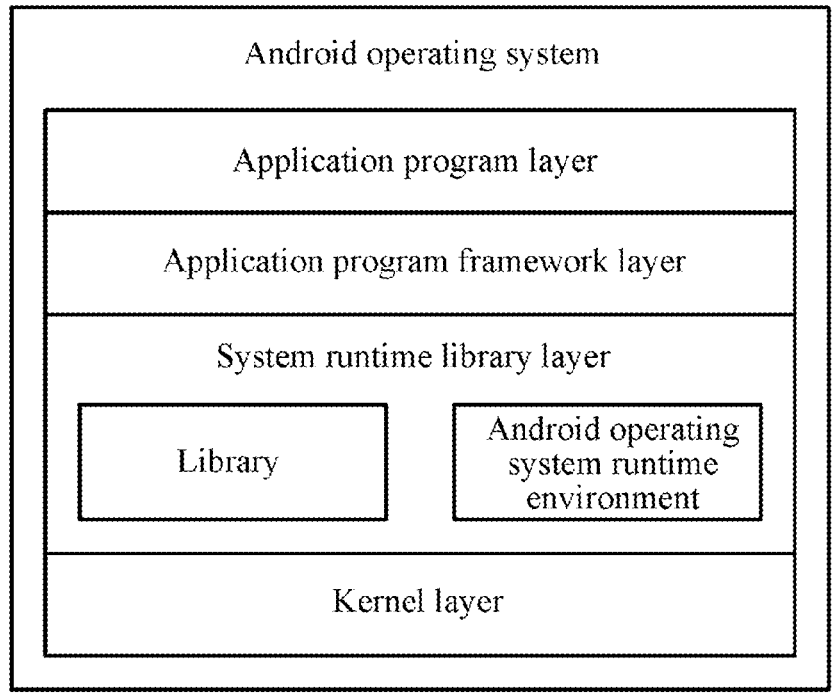
FIG. 1 is a schematic architectural diagram of an Android operating system according to an embodiment of the present disclosure.

The following describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present application.

The term "and/or" in this specification is an association relationship for describing associated objects and represents that three relationships may exist. For example, A and/or B may represent the following three cases: Only A exists, both A and B exist, and only B exists. The symbol "/" herein represents that associated objects have an "or" relationship. For example, "A/B" represents "A or B".

The terms "first", "second", and the like herein are intended to distinguish between different objects but do not indicate a particular order of the objects. For example, a first input, a second input, and the like are used for distinguishing between different inputs rather than describing a specific order of the inputs.

In addition, in the embodiments of the present disclosure, the word "exemplary" or "for example" is used to represent giving an example, an illustration, or a description. Any embodiment or design scheme described as an "exemplary" or "for example" in the embodiments of the present disclosure should not be explained as being more preferred or having more advantages than another embodiment or design scheme. Exactly, use of the word "example" or "for example" or the like is intended to present a related concept in a specific manner.

In the description of the embodiments of the present disclosure, "plurality" means two or more unless otherwise described. For example, "a plurality of elements" means two or more elements.

Embodiments of the present disclosure provide an object display method and an electronic device, applied to a scenario of magnifying display of an object in an image. Specifically, in a case that an electronic device displays a first image that is acquired by a first camera and includes a plurality of objects, the electronic device may obtain a second image that is acquired by a second camera and includes the plurality of objects (the plurality of objects are images of a plurality of first physical objects, and resolution of the second image is greater than that of the first image). In addition, the electronic device may display, in the first image according to the second image, at least one identifier for indicating M (M is a positive integer) target objects in the plurality of objects in the first image. Then the electronic device may receive a first input by a user for a first object in the M target object(s) in the first image. The electronic device magnifies display of a first object in the second image in response to the first input. By means of the solution, if the user needs to view a magnified display effect of a target object in the plurality of objects in the first image, the electronic device may obtain the second image that includes the plurality of objects, and magnify display of the target object in the second image. Resolution of the second image is greater than that of the first image. Therefore, when the electronic device magnifies the display of the target object in the second image, it can be ensured that the electronic device magnifies the display of the target object with an adequate display effect.

The electronic device in the embodiments of the present disclosure may be an electronic device with an operating system. The operating system may be an Android operating system or may be an iOS operating system or may be another possible operating system. This is not specifically limited in the embodiments of the present disclosure.

An Android operating system is used as an example below to describe a software environment to which the object display method according to the embodiments of the present disclosure is applied.

FIG. 1 is a schematic architectural diagram of a possible Android operating system according to an embodiment of the present disclosure. In FIG. 1, the architecture of the Android operating system includes four layers: an application program layer, an application program framework layer, a system runtime library layer, and a kernel layer (which may be specifically a Linux kernel layer).

The application program layer includes various application programs (including system application programs and third-party application programs) in the Android operating system. For example, the application program layer may include an application program displaying an image in the embodiments of the present disclosure, for example, any application program that may display an image such as a gallery application program, a camera application program, a shopping application program, and a communication application program.

The application program framework layer is a framework for application programs. A developer may develop some application programs based on the application program framework layer in the case of conforming to the development principle of the framework for application programs. For example, the application program displaying an image in the embodiments of the present disclosure may be developed based on the application program framework layer.

Generally, the application program displaying an image in the embodiments of the present disclosure may include two parts. One part is an image display service (service) run in the background of an electronic device, and is configured to detect an input by triggering display of an image by a user, recognize an object in the displayed image, extract the object in the image, generate an identifier, and perform other operations. The other part is content displayed on a screen of the electronic device, for example, a picture displayed on the screen of the electronic device.

The system runtime library layer includes a library (also referred to as a system library) and an Android operating system runtime environment. The library mainly provides the Android operating system with various types of resources required by the Android operating system. The Android operating system runtime environment is used for providing the Android operating system with a software environment.

The kernel layer is an operating system layer of the Android operating system and is the bottommost layer in software layers of the Android operating system. The kernel layer provides the Android operating system with kernel system services and hardware-related drivers based on the Linux kernel.

The Android operating system is used as an example. In the embodiments of the present disclosure, a developer may develop, based on the system architecture of the foregoing Android operating system shown in FIG. 1, a software program for implementing the object display method provided in the embodiments of the present disclosure, to allow the object display method to be performed based on the Android operating system shown in FIG. 1. That is, the processor or the electronic device may run the software program in the Android operating system to implement the object display method provided in the embodiments of the present disclosure.

The electronic device in the embodiments of the present disclosure may be a mobile electronic device or may be a non-mobile electronic device. For example, the mobile electronic device may be a mobile phone, a tablet computer, a notebook computer, a palmtop computer, an in-vehicle terminal, a wearable device, an Ultra-Mobile Personal Computer (UMPC), a netbook, a Personal Digital Assistant (PDA), or the like. The non-mobile electronic device may be a Personal Computer (PC), a television (TV), a teller machine, a self-service machine, or the like. This is not specifically limited in the embodiments of the present disclosure.

The object display method provided in the embodiments of the present disclosure may be performed by the foregoing electronic device or may be a functional module and/or a functional entity that can implement the object display method in the electronic device. Details may be determined according to an actual use requirement. This is not limited in the embodiments of the present disclosure. The object display method provided in the embodiments of the present disclosure is exemplarily described below by using an electronic device as an example.

In the embodiments of the present disclosure, the electronic device may be an electronic device provided with a plurality of cameras. For the electronic device provided with a plurality of cameras (for example, including a first camera and a second camera in the embodiments of the present disclosure), when the electronic device acquires an image, the electronic device may acquire images separately by using the first camera and the second camera, to respectively obtain a first image and a second image. Generally, the first image acquired by the first camera may be stored at a position (for example, a gallery application program) that is in the electronic device and is visible to a user. That is, the user may interact with the gallery application program to view the first image. The second image acquired by the second camera may be stored at a position that is in a server or the electronic device and is invisible to the user. That is, the user cannot view the second image. When the user needs to view a magnified display effect of a target object in the first image, the user may trigger (for example, trigger the electronic device to enter an object analysis and magnification mode) the electronic device to obtain the second image from the server or the electronic device, recognize a target object from the second image, then magnify the target object according to a preset power, and finally display the magnified target object. That is, the electronic device may magnify display of the target object in the second image. In this case, resolution of the second image is greater than that of the first image. Therefore, when the electronic device magnifies the display of the target object in the second image, it can be ensured that the electronic device magnifies the display of the target object with an adequate display effect.

The details of the object display method provided in the embodiments of the present disclosure are exemplarily described below with reference to the accompanying drawings.

Figure 2:
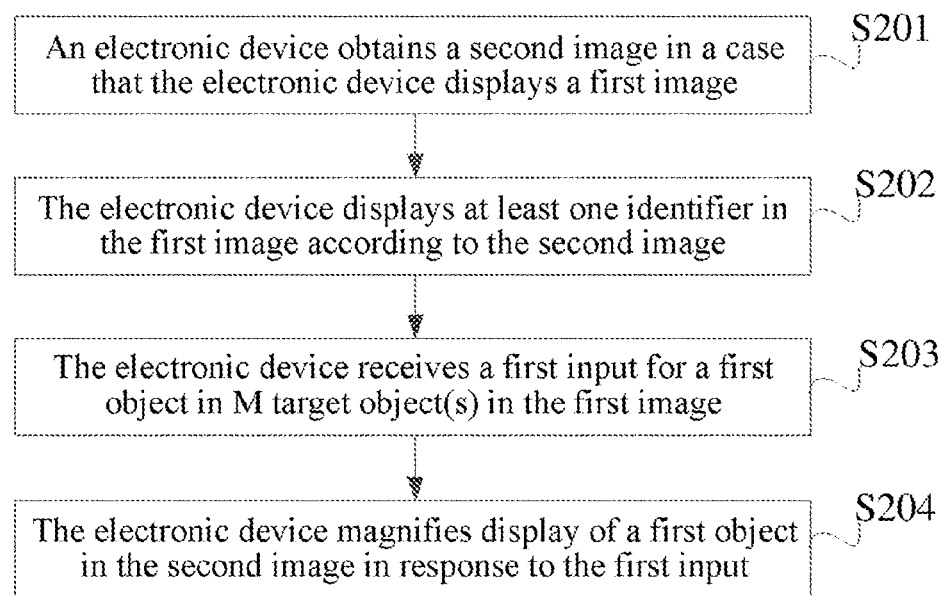
FIG. 2 is a schematic diagram 1 of an object display method according to an embodiment of the present disclosure.

As shown in FIG. 2, the embodiments of the present disclosure provide an object display method. The method may include the following S201 to S204.

S201: An electronic device obtains a second image in a case that the electronic device displays a first image.

For example, it is assumed that the first image is an image in the gallery application program. In this case, a user may trigger the electronic device to run the gallery application program in the foreground. In a case that the electronic device runs the application program in the foreground, an interface of the gallery application program may be displayed on a screen of the electronic device. Next, the user may perform an operation on the interface to interact with the gallery application program to allow the screen of the electronic device to display the first image. In addition, the electronic device may obtain the second image acquired when the electronic device acquires the first image.

The first image may be an image acquired by the electronic device by using a first camera, and the second image may be an image acquired by the electronic device by using a second camera.

For example, in the embodiments of the present disclosure, a focal length of the second camera is greater than that of the first camera. That is, in comparison between the second camera and the first camera, the second camera may be a long-focus camera, and the first camera may be a short-focus camera. For example, the first camera may be a wide-angle camera.

For example, in the embodiments of the present disclosure, the electronic device may use the wide-angle camera by default to acquire an image. That is, generally, when the user triggers the electronic device to acquire an image, in addition to that the user triggers the electronic device to select the long-focus camera, the electronic device may preferentially use the short-focus camera (for example, the foregoing wide-angle camera) to acquire an image.

For example, in the embodiments of the present disclosure, the second image may be an image acquired by the electronic device by using the second camera and stored in a case that the user triggers the first camera of the electronic device to acquire the first image. Specifically, in a possible implementation, when the user triggers the first camera of the electronic device to acquire the first image, the electronic device may automatically acquire the second image by using the second camera and store the second image. In another possible implementation, after the user triggers the first camera of the electronic device to acquire the first image, the electronic device may automatically acquire the second image by using the second camera and store the second image.

For example, in the embodiments of the present disclosure, each of the first image and the second image may include a plurality of objects. The plurality of objects may be images of a plurality of first physical objects. That is, the first image and the second image may be acquired images of the plurality of first physical objects in the same area. That is, an area in which the first camera acquires the first image and an area in which the second camera acquires the second image may be the same area. Certainly, it may be understood that the same area is only a theoretical concept. During actual implementation, a deviation may be allowed between the two areas (the deviation may be within an acceptable range).

It needs to be noted that in the embodiments of the present disclosure, even if the area in which the first camera acquires the first image and the area in which the second camera acquires the second image are the same, because the first camera and the second camera have different focal lengths, in addition to the plurality of objects, other different objects may be further included in the first image and the second image. That is, in addition to the plurality of first physical objects, other different physical objects may be further included in the same area.

It may be understood that in the embodiments of the present disclosure, the objects in the first image may be displayed images of physical objects in an area (the area in which the first image is acquired) corresponding to the first image in the first image. The objects in the second image may be displayed images of physical objects in an area (the area in which the second image is acquired) corresponding to the second image in the second image. For example, in the first image, a bee image in the first image may be a displayed image of a "bee" in the area corresponding to the first image in the first image.

For example, in the embodiments of the present disclosure, resolution of the second image is greater than that of the first image.

It may be understood that in a case that the focal length of the second camera is greater than that of the first camera, for the same area, resolution of the image in the area acquired by using the second camera is greater than that of the image in the area acquired by using the first camera.

S202: The electronic device displays at least one identifier in the first image according to the second image.

The at least one identifier may be used for indicating M target object(s) in the plurality of objects in the first image. Specifically, each identifier in the at least one identifier may be used for indicating at least one target object in the M target object(s) in the first image, where M is a positive inter.

It needs to be noted that in the embodiments of the present disclosure, physical objects corresponding to some target objects in the M target object(s) may be located in a relatively small area (for example, distances between the physical objects corresponding to these target objects are relatively small), and when the first image is displayed on the electronic device, a display size of the area in the first image is relatively small (for example, the user cannot distinguish these target objects corresponding to the area in the first image with naked eyes). Therefore, when displaying the at least one identifier, the electronic device may display an identifier for these target objects corresponding to the area. That is, the identifier may indicate these target objects corresponding to the area.

For example, in the embodiments of the present disclosure, when displaying the at least one identifier, the electronic device may display the at least one identifier in the area in which the M target object(s) in the first image are located. For example, the electronic device may display an identifier in an area in which a target object or some target objects in the first image are located, to indicate the target object or the some target objects.

For example, in the embodiments of the present disclosure, the foregoing S202 may be specifically implemented by using the following S202a and S202b.

S202a: The electronic device recognizes the objects in the second image according to target attribute information to obtain M target object(s) in the second image.

At least one physical object corresponding to the M target object(s) in the second image may belong to an attribute indicated by the target attribute information.

For example, it is assumed that the target attribute information is an animal attribute (that is, indicates an animal). The electronic device may recognize the objects in the second image according to the animal attribute, to obtain all animal images in the second image. That is, the M target object(s) in the second image are obtained, and a physical object corresponding to every target object in the M target object(s) belongs to an animal attribute. In some embodiments, it is assumed that the target attribute information is a person attribute (that is, indicates a person). The electronic device may recognize the objects in the second image according to the person attribute, to obtain all person images in the second image. That is, the M target object(s) in the second image are obtained, and a physical object corresponding to every target object in the M target object(s) belongs to a person attribute.

S202b: The electronic device displays at least one identifier in the first image according to the M target object(s) in the second image.

In the embodiments of the present disclosure, after the electronic device obtains the M target object(s) from the second image, the electronic device may display the at least one identifier in the first image according to the M target object(s) in the second image.

Figure 3:
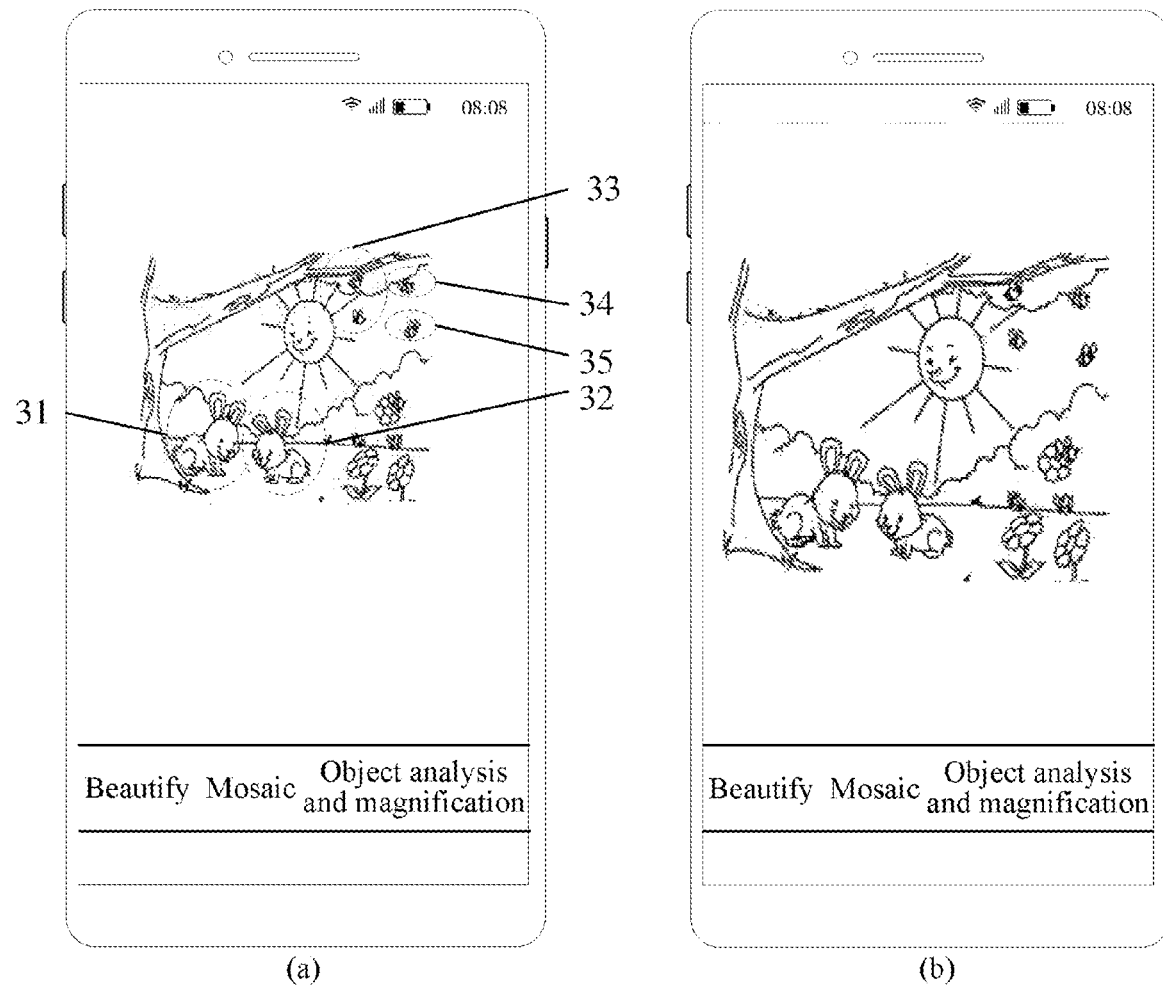
FIG. 3 is a schematic diagram 1 of an interface to which an object display method according to an embodiment of the present disclosure is applied.

For example, it is assumed that the target attribute information is the animal attribute. (a) in FIG. 3 is a schematic diagram of an interface of displaying the first image by the electronic device. (b) in FIG. 3 is a schematic diagram of an interface of displaying the second image by the electronic device. The schematic diagram of the first image and the schematic diagram of the second image are shown by using an example in which the first image and the second image include the same objects. After the electronic device recognizes the objects in the second image according to the animal attribute to obtain all animal images in the second image, the electronic device may display in the first image identifiers 31 to 35 shown in (a) in FIG. 3. The identifier 31 may indicate an animal image 1, the identifier 32 may indicate an animal image 2, the identifier 33 may indicate an animal image 3 and an animal image 4, the identifier 34 may indicate an animal image 5, and the identifier 35 may indicate an animal image 6. It may be understood that an animal corresponding to the animal image 3 and an animal corresponding to the animal image 4 are located in the same area, and display sizes of the animal image 3 and the animal image 4 in a preview image are relatively small. Therefore, the electronic device may display an identifier 33 for the animal image 3 and the animal image 4.

For example, in the embodiments of the present disclosure, the foregoing S202a may be specifically implemented by using the following S202a1 and S202a2.

S202a1: The electronic device obtains at least one template image from a template library according to the target attribute information.

At least one physical object corresponding to at least one object in the at least one template image may belong to the attribute indicated by the target attribute information.

For example, it is assumed that the target attribute information is the animal attribute. At least one physical object corresponding to the at least one object in the at least one template image obtained by the electronic device from the template library according to the animal attribute belong to the animal attribute.

For example, in the embodiments of the present disclosure, in a case that a connection is established between the electronic device and a server, the electronic device may obtain the at least one template image from a template library of the server. In a case that a connection is not established between the electronic device and the server, the electronic device may obtain the at least one template image from a template library of the electronic device. The template image in the template library of the server and the template image in the template library of the electronic device are both prestored template images.

S202a2: The electronic device matches the second image against the at least one template image to recognize the objects in the second image.

In the embodiments of the present disclosure, after the electronic device obtains the at least one template image, the electronic device may match the second image against the at least one template image to recognize the objects in the second image.

For example, in the embodiments of the present disclosure, the electronic device may match feature points corresponding to the second image against feature points corresponding to the at least one template image to recognize the objects in the second image. Specifically, the electronic device may first extract the feature points corresponding to the second image from the second image, and extract the feature points corresponding to each template image in the at least one template image from the at least one template image, and then the electronic device may separately match the feature points corresponding to the second image against the feature points corresponding to the each template image, to recognize the objects in the second image. The electronic device may extract the feature points from the second image and the template image by using an image processing algorithm.

For example, the image processing algorithm may be any possible image processing algorithm such as a face recognition algorithm (for recognizing a human face) or a cluster analysis algorithm (for recognizing a physical object), and may be specifically determined according to an actual use requirement. This is not limited in the embodiments of the present disclosure.

In the embodiments of the present disclosure, the electronic device may recognize the objects in the second image according to the feature points corresponding to the second image and the obtained feature points corresponding to each template image in the at least one template image. Therefore, the electronic device may accurately recognize the objects in the second image, thereby accurately recognizing objects belonging to an attribute that the user needs to recognize in the second image.

S203: The electronic device receives a first input for a first object in M target object(s) in the first image.

In the embodiments of the present disclosure, the first input may be used by the user to determine the first object. That is, the user may use the first input to trigger the electronic device to determine the first object.

For example, in the embodiments of the present disclosure, the first input may be an input by the user for the first object, or the first input may be an input by the user for an identifier used for indicating the first object. Details may be determined according to an actual use requirement. This is not limited in the embodiments of the present disclosure.

Specifically, in the embodiments of the present disclosure, in a case that each identifier in the at least one identifier indicates one object, the first input may be an input by the user for the first object or an input by the user for an identifier used for indicating the first object. In a case that the identifier in the at least one identifier indicates a plurality of objects, in a possible implementation, the user may first perform an input for the identifier to trigger the electronic device to display the plurality of objects indicated by the identifier, and then the user may perform the first input for the first object (in this case, the first object is one object) in the plurality of objects. In another possible implementation, the user may directly perform the first input for the identifier (in this case, the first object is a plurality of objects).

For example, in the embodiments of the present disclosure, the first input may be an input in any possible form such as a click input, a long press input or a heavy press input. Details may be determined according to an actual use requirement. This is not limited in the embodiments of the present disclosure.

The click input may be a single click input, a double click input or an input by clicking a preset quantity of times. The long press input may be an input by a press with a duration greater than or equal to a time threshold of the user on the first object or of the user on the identifier for indicating the first object. The heavy press input may be an input by a press with a pressure value greater than or equal to a pressure threshold of the user on the first object or of the user on the identifier for indicating the first object.

For example, in the embodiments of the present disclosure, the preset quantity of times, the time threshold, and the pressure threshold may be values preset in the electronic device. The preset quantity of times, the time threshold, and the pressure threshold may be values preset by a manufacturer of the electronic device in the electronic device. Details may be determined according to an actual use requirement. This is not limited in the embodiments of the present disclosure.

S204: The electronic device magnifies display of a first object in the second image in response to the first input.

In the embodiments of the present disclosure, after the electronic device receives the first input by the user for the first object in the M target object(s) in the first image, the electronic device may magnify the display of the first object in the second image in response to the first input.

Figure 4:
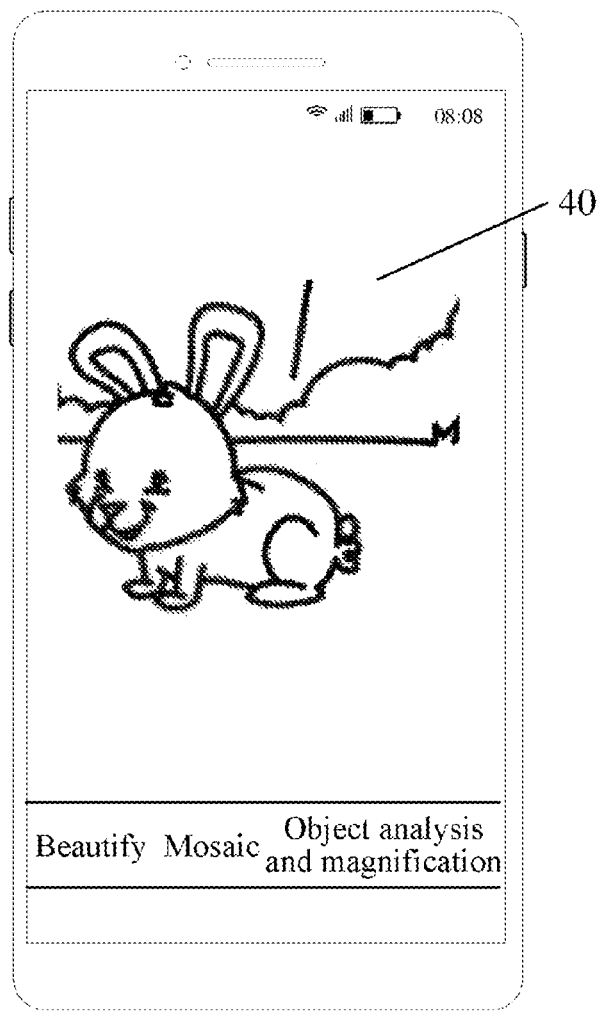
FIG. 4 is a schematic diagram 2 of an interface to which an object display method according to an embodiment of the present disclosure is applied.

For example, with reference to FIG. 3, after the electronic device displays in the first image the identifiers shown by 31 to 35 in FIG. 3, it is assumed that the first object is the object indicated by the identifier 32 in FIG. 3. In this case, after the user clicks the identifier 32, that is, the electronic device receives the first input by the user, in response to the first input, as shown in FIG. 4, the electronic device may magnify the display of the first object (shown by 40 in FIG. 4) in the second image (shown by (b) in FIG. 3).

In the embodiments of the present disclosure, when the user needs to view a magnified display effect of a target object in the plurality of objects in the first image, the electronic device may obtain the second image that includes the plurality of objects, and magnify display of the target object in the second image. Resolution of the second image is greater than that of the first image. Therefore, when the electronic device magnifies the display of the target object in the second image, it can be ensured that the electronic device magnifies the display of the target object with an adequate display effect.

In the embodiments of the present disclosure, the second image is an image acquired by the electronic device by using a long-focus camera. Therefore, even if the electronic device magnifies the display of the target object in the second image by a preset power, the electronic device can still magnify the display of the target object with an adequate display effect.

For example, in the embodiments of the present disclosure, in a case that the electronic device displays the first image, if the user needs to view a display effect after some target objects in the first image are magnified, the user may use an input (for example, a second input below) to trigger the electronic device to enter an object analysis and magnification mode, and then the electronic device may automatically obtain the second image in the object analysis and magnification mode.

Figure 5:
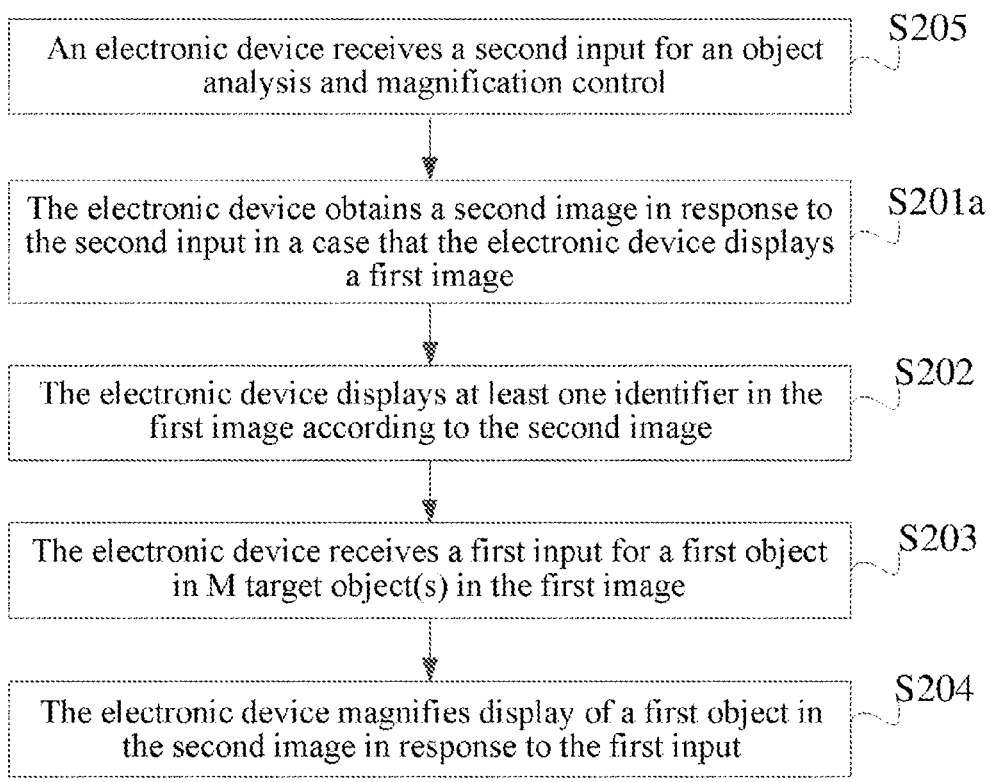
FIG. 5 is a schematic diagram 2 of an object display method according to an embodiment of the present disclosure.

For example, with reference to FIG. 2 above, as shown in FIG. 5, before the foregoing S201, the object display method provided in the embodiments of the present disclosure may further include the following S205. In addition, the foregoing S201 may be specifically implemented by using the following S201a.

S205: An electronic device receives a second input for an object analysis and magnification control.

For example, in the embodiments of the present disclosure, after the user triggers the electronic device to run a gallery application program, the electronic device may run the gallery application program in the foreground, and the electronic device may display a gallery application interface (that is, an interface of the gallery application program) on a screen. The gallery application interface may include at least one control (each control may be used for indicating one mode). As shown by (a) in FIG. 6, the at least one control may include an object analysis and magnification control. The object analysis and magnification control may be used for indicating an object analysis and magnification mode. Specifically, in the object analysis and magnification mode, the electronic device may obtain the second image from the electronic device according to a requirement of the user, recognize the target object from the second image, then magnifies the target object according to a preset power, and finally displays the magnified target object for the user to view the magnified display effect of the target object.

Figure 6:
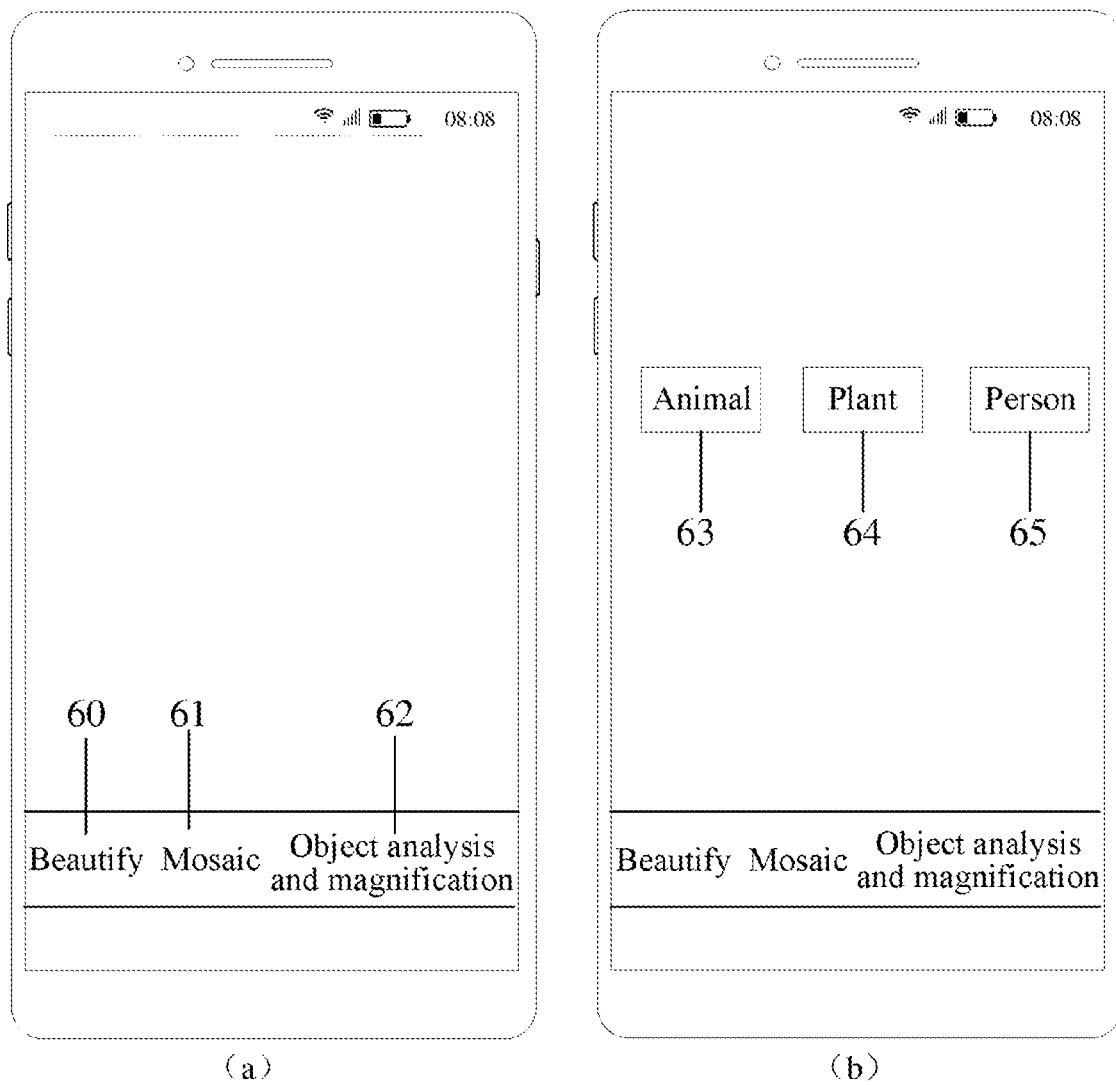
FIG. 6 is a schematic diagram 3 of an interface to which an object display method according to an embodiment of the present disclosure is applied.

For example, in the embodiments of the present disclosure, as shown by (a) in FIG. 6, the at least one control may further include any other possible control such as a beautification control and a mosaic control. The beautification control may be used for indicating a beautification mode, and the mosaic control may be used for indicating a mosaic mode. In the beautification mode, the electronic device may perform a beautification operation on an image; and in the mosaic mode, the electronic device may perform a mosaic operation on an image.

For example, in the embodiments of the present disclosure, the second input may be specifically a click input, a long press input or a heavy press input by the user for the object analysis and magnification control or may be a speech input by the user or may be any possible input such as a gesture input by the user. This is not limited in the embodiments of the present disclosure.

For example, the speech input may be any possible speech input such as "object analysis and magnification" uttered by the user. The gesture input may be a gesture input the same as a preset gesture input (it may be understood that the preset gesture input may be a preset gesture input for implementing the obtaining of the second image in the embodiments of the present disclosure).

S201a: The electronic device obtains a second image in response to the second input in a case that the electronic device displays a first image.

In the embodiments of the present disclosure, in a case that the electronic device displays the first image acquired by the first camera and the electronic device receives the second input by the user for the object analysis and magnification control, the electronic device may obtain, in response to the second input, the second image acquired by the second camera.

For example, in the embodiments of the present disclosure, after the electronic device receives the second input by the user for the object analysis and magnification control, the electronic device may control, in response to the second input, the gallery application program of the electronic device to be in the object analysis and magnification mode. It may be understood that after the electronic device receives the second input by the user for the object analysis and magnification control, the electronic device may control the gallery application program to be in the object analysis and magnification mode.

Further, in a case that the electronic device displays the first image, and the electronic device receives the second input by the user for the object analysis and magnification control, the electronic device may control, in response to the second input, the gallery application program of the electronic device to be in the object analysis and magnification mode, and obtain the second image.

It needs to be noted that after the electronic device performs the second input on the object analysis and magnification control (that is, the gallery application program is in the object analysis and magnification mode), if the electronic device displays the first image acquired by the first camera, the electronic device may automatically obtain the second image acquired by the second camera. When the gallery application program is not in the object analysis and magnification mode, even if the electronic device displays the first image acquired by the first camera, the electronic device does not obtain the second image acquired by the second camera.

In the embodiments of the present disclosure, because the second camera is a long-focus camera, the second image that is obtained by the electronic device and is acquired by the second camera has relatively high resolution, so that a success rate of recognizing the objects in the second image by the electronic device is relatively high. In this way, the electronic device can accurately recognize the target object in the second image. In addition, the second image has relatively high resolution. Therefore, even if the electronic device magnifies the display of a target object in the second image, the electronic device can still magnify the display of the target object with an adequate display effect, so that a requirement of viewing the magnified display effect of the target object by the user can be better satisfied.

Further, the electronic device can obtain the second image acquired by the second camera only in a case that the gallery application program is in the object analysis and magnification mode, that is, the electronic device does not obtain the second image acquired by the second camera in a case that the gallery application program is not in the object analysis and magnification mode. Therefore, the electronic device can be prevented from performing unnecessary acquisition operations, so that the power consumption of the electronic device can be reduced.

For example, in the embodiments of the present disclosure, before the electronic device recognizes the objects in the second image according to the target attribute information, the electronic device may first display at least one attribute option, and then the user may select a target attribute option from the at least one attribute option, so that the electronic device may recognize the objects in the second image according to the target attribute information indicated by the target attribute option, to obtain the target object corresponding to the target attribute information.

For example, before the foregoing S202a, the object display method provided in the embodiments of the present disclosure may further include the following S206 and S207. In addition, the foregoing S202a may be specifically implemented by using the following S202a3.

S206: The electronic device displays at least one attribute option.

Each attribute option in the at least one attribute option may be used for indicating one piece of attribute information.

For example, in the embodiments of the present disclosure, the at least one attribute option may include any possible attribute option such as an animal option, a plant option, a person option, and an electronic product option. Details may be set according to an actual use requirement. This is not limited in the embodiments of the present disclosure.

In the embodiments of the present disclosure, after the user selects the object analysis and magnification control from the at least one control, that is, the electronic device receives the second input by the user, in response to the second input, the electronic device may be controlled to be in the object analysis and magnification mode, and the at least one attribute option may be displayed, so that the user may select one attribute option from the at least one attribute option, and then the electronic device is triggered to recognize the at least one object (at least one physical object corresponding to the at least one object belongs to an attribute corresponding to the attribute option) corresponding to the attribute option from the second image.

For example, it is assumed that the at least one attribute option includes an animal option, a plant option, and a person option. (a) in FIG. 6 is a schematic diagram of a gallery application interface displayed by the electronic device. The interface includes a beautification control (shown by 60 in (a) in FIG. 6), a mosaic control (shown by 61 in (a) in FIG. 6), and an object analysis and magnification control (shown by 62 in (a) in FIG. 6). After the user selects the object analysis and magnification control 62, that is, the electronic device receives the second input by the user, in response to the second input, as shown in (b) FIG. 6, the electronic device may control the gallery application program to be in the object analysis and magnification mode (display of an option of the object analysis and magnification mode is magnified in the figure to indicate that the gallery application program is already in the object analysis and magnification mode), and display an animal option (shown by 63 in (b) in FIG. 6), a plant animal option (shown by 64 in (b) in FIG. 6), and a person option (shown by 65 in (b) in FIG. 6).

S207: The electronic device receives a third input by the user for a target attribute option in the at least one attribute option.

The target attribute option may be used for indicating the target attribute information.

In the embodiments of the present disclosure, the third input may be used for determining the target attribute information. That is, the user may perform the third input on the target attribute option in the at least one attribute option, to trigger the electronic device to determine the target attribute information indicated by the target attribute option.

For example, in the embodiments of the present disclosure, the third input may be specifically an input by the user for the target attribute option. The third input may be specifically an input in any possible form such as a click input, a long press input or a heavy press input by the user for the target attribute option. Details may be determined according to an actual use requirement. This is not limited in the embodiments of the present disclosure.

For the description of the click input, the long press input or the heavy press input, reference may be made to related description of the click input, the long press input or the heavy press input in the foregoing embodiments. To avoid repetition, details are not described herein again.

S202a3: The electronic device recognizes, in response to the third input, the objects in the second image according to the target attribute information indicated by the target attribute option to obtain M target object(s) in the second image.

In the embodiments of the present disclosure, after the electronic device receives the third input by the user for the target attribute option in the at least one attribute option, the electronic device may recognize, in response to the third input, the objects in the second image according to the target attribute information indicated by the target attribute option, to obtain the M target object(s) in the second image.

It needs to be noted that for the description of the recognizing the objects in the second image according to the target attribute information, reference may be made to the description of the foregoing S202a1 and S202a2. To avoid repetition, details are not described herein again.

In the embodiments of the present disclosure, the user may select an attribute option according to an actual use requirement of the user. Therefore, the electronic device can accurately recognize the objects corresponding to the attribute information indicated by the attribute option in the second image, that is, the electronic device can accurately recognize objects that the user needs to recognize, to prevent the electronic device from recognizing other objects that the user does not need to recognize.

It should be noted that in the embodiments of the present disclosure, the object display methods shown in the foregoing accompanying drawings of methods are all exemplarily described by using the accompanying drawings in the embodiments of the present disclosure as examples. During specific implementation, the object display methods shown in the foregoing accompanying drawings of methods may be implemented with reference to any other drawing that can be combined in the foregoing embodiments.

Figure 7:
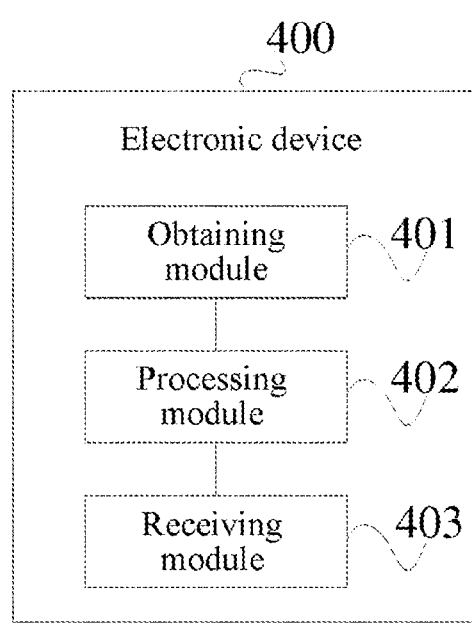
FIG. 7 is a schematic structural diagram of an electronic device according to an embodiment of the present disclosure.

As shown in FIG. 7, the embodiments of the present disclosure provide an electronic device 400. The electronic device 400 may include an obtaining module 401, a processing module 402, and a receiving module 403. The obtaining module 401 may be configured to obtain a second image in a case that a first image is displayed, where the first image may be an image acquired by a first camera, the second image may be an image acquired by a second camera, each of the first image and the second image may include a plurality of objects, the plurality of objects are images of a plurality of first physical objects, and resolution of the second image is greater than that of the first image. The processing module 402 may be configured to display at least one identifier in the first image according to the second image obtained by the obtaining module 401, where the at least one identifier may be used for indicating M target object(s) in the plurality of objects in the first image, and M is a positive integer. The receiving module 403 may be configured to receive a first input for a first object in the M target object(s) in the first image displayed by the processing module 402. The processing module 402 may be further configured to magnify display of a first object in the second image in response to the first input received by the receiving module 403.

For example, in the embodiments of the present disclosure, the receiving module 403 may be further configured to receive a second input for an object analysis and magnification control before the obtaining module 401 obtains the second image; and the obtaining module 401 may be further configured to obtain the second image in response to the second input received by the receiving module 403.

For example, in the embodiments of the present disclosure, the processing module 402 may be further configured to: recognize the objects in the second image according to target attribute information to obtain M target object(s) in the second image; and display the at least one identifier in the first image according to the M target object(s) in the second image, where at least one physical object corresponding to the M target object(s) in the second image may belong to an attribute indicated by the target attribute information.

For example, in the embodiments of the present disclosure, the processing module 402 may be further configured to: display at least one attribute option before the objects in the second image are recognized according to the target attribute information, where each attribute option in the at least one attribute option may be used for indicating one piece of attribute information; and the receiving module 403 may be further configured to receive a third input for a target attribute option in the at least one attribute option displayed by the processing module 402; and the processing module 402 may be further configured to recognize the objects in the second image according to the target attribute information indicated by the target attribute option in response to the third input received by the receiving module 403.

For example, in the embodiments of the present disclosure, the processing module 402 may be further configured to: obtain at least one template image from a template library according to the target attribute information; and match the second image against the at least one template image to recognize the objects in the second image, where at least one physical object corresponding to at least one object in the at least one template image may belong to the attribute indicated by the target attribute information.

For example, in the embodiments of the present disclosure, the second image may be an image acquired by the second camera and stored in a case that the first camera is triggered to acquire the first image.

For example, in the embodiments of the present disclosure, a focal length of the second camera may be greater than that of the first camera.

The electronic device provided in the embodiments of the present disclosure can implement various processes implemented by the electronic device in the foregoing method embodiments. To avoid repetition, details are not described herein again.

In the electronic device provided in the embodiments of the present disclosure, in a case that the electronic device displays a first image that is acquired by a first camera and includes a plurality of objects, the electronic device may obtain a second image that is acquired by a second camera and includes the plurality of objects (the plurality of objects are images of a plurality of first physical objects, and resolution of the second image is greater than that of the first image). In addition, the electronic device may display, in the first image according to the second image, at least one identifier for indicating M target object(s) in the plurality of objects in the first image. Then the electronic device may receive a first input by a user for a first object in the M target object(s) in the first image. The electronic device magnifies display of a first object in the second image in response to the first input. By means of the solution, if the user needs to view a magnified display effect of a target object in the plurality of objects in the first image, the electronic device may obtain the second image that includes the plurality of objects, and magnify display of the target object in the second image. Resolution of the second image is greater than that of the first image. Therefore, when the electronic device magnifies the display of the target object in the second image, it can be ensured that the electronic device magnifies the display of the target object with an adequate display effect.

Figure 8:
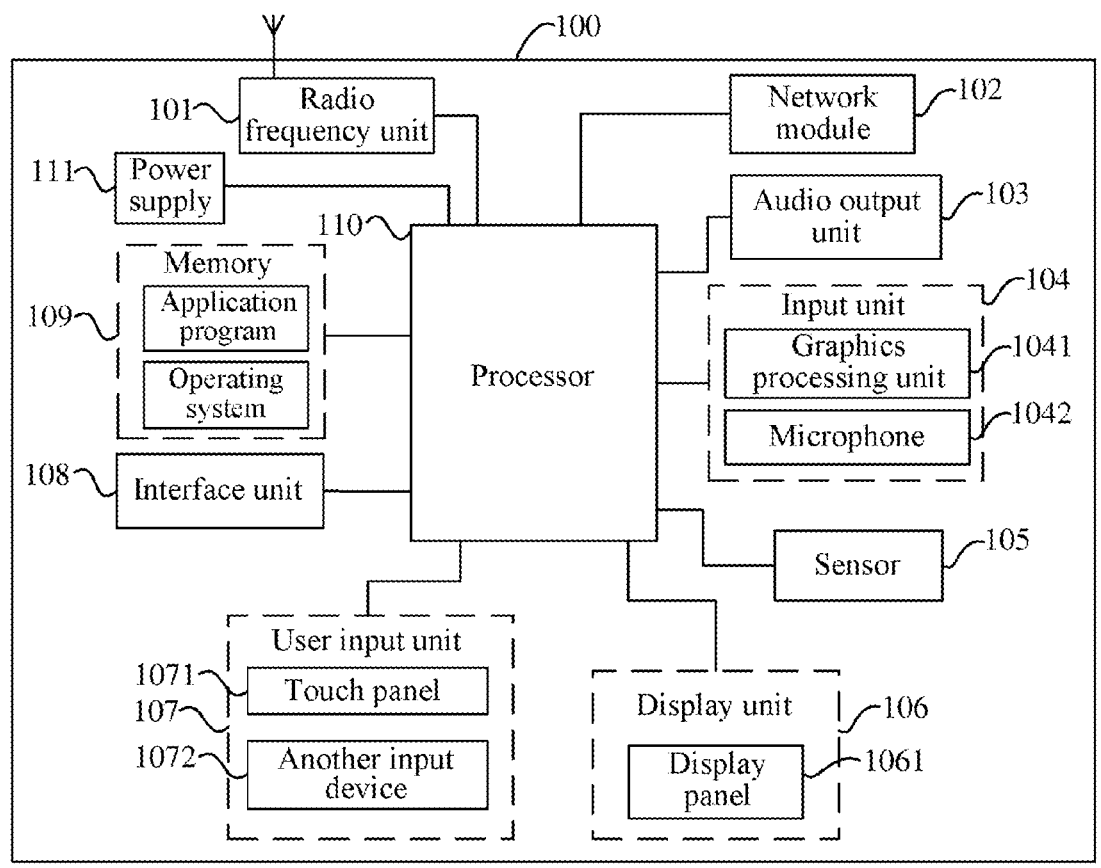
FIG. 8 is a schematic hardware diagram of an electronic device according to an embodiment of the present disclosure.

FIG. 8 is a schematic diagram of the hardware of an electronic device according to various embodiments of the present disclosure. As shown in FIG. 8, the electronic device 100 includes, but is not limited to, components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the electronic device structure shown in FIG. 8 does not constitute a limitation to the electronic device. The electronic device may include more or fewer components than those shown in the figure, or some components may be combined, or a different component deployment may be used. In the embodiments of the present disclosure, the electronic device includes, but is not limited to, a mobile phone, a tablet computer, a notebook computer, a palmtop computer, an in-vehicle terminal, a wearable device, a pedometer, and the like.

The processor 110 may be configured to: obtain a second image in a case that the display unit 106 displays a first image, control the display unit 106 to display at least one identifier in the first image according to the second image, control the user input unit 107 to receive a first input for a first object in M target object(s) in the first image, and magnify display of a first object in the second image in response to the first input. The first image is an image acquired by a first camera, the second image is an image acquired by a second camera, each of the first image and the second image includes a plurality of objects, the plurality of objects are images of a plurality of first physical objects, and resolution of the second image is greater than that of the first image. The at least one identifier is used for indicating the M target object(s) in the plurality of objects in the first image, and M is a positive integer.

It may be understood that in the embodiments of the present disclosure, the obtaining module 401 and the processing module 402 in the schematic structural diagram (for example, FIG. 7 above) of the foregoing electronic device may be implemented by using the processor 110. The receiving module 403 in the schematic structural diagram (for example, FIG. 7 above) of the foregoing electronic device may be implemented by using the foregoing user input unit 107.

The embodiments of the present disclosure provide an electronic device. In a case that the electronic device displays a first image that is acquired by a first camera and includes a plurality of objects, the electronic device may obtain a second image that is acquired by a second camera and includes the plurality of objects (the plurality of objects are images of a plurality of first physical objects, and resolution of the second image is greater than that of the first image). In addition, the electronic device may display, in the first image according to the second image, at least one identifier for indicating M target object(s) in the plurality of objects in the first image. Then the electronic device may receive a first input by a user for a first object in the M target object(s) in the first image. The electronic device magnifies display of a first object in the second image in response to the first input. By means of the solution, if the user needs to view a magnified display effect of a target object in the plurality of objects in the first image, the electronic device may obtain the second image that includes the plurality of objects, and magnify display of the target object in the second image. Resolution of the second image is greater than that of the first image. Therefore, when the electronic device magnifies the display of the target object in the second image, it can be ensured that the electronic device magnifies the display of the target object with an adequate display effect.

It should be understood that in the embodiments of the present disclosure, the radio frequency unit 101 may be configured to send and receive a signal in an information receiving and sending process or a call process. Specifically, the radio frequency unit receives downlink data from a base station, and then delivers the downlink data to the processor 110 for processing; and in addition, sends uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with a network and another device through a wireless communication system.

The electronic device provides wireless broadband Internet access to a user by using the transmission module 102, for example, helps the user to send and receive an email, browse a webpage, and access stream media, and the like.

The audio output unit 103 may convert audio data received by the radio frequency unit 101 or the network module 102 or stored in the memory 109 into an audio signal and output the audio signal as sound. Moreover, the audio output unit 103 may provide an audio output (such as call signal receiving sound or message receiving sound) related to a specific function executed by the electronic device 100. The audio output unit 103 includes a loudspeaker, a buzzer, a receiver, and the like.

The input unit 104 is configured to receive an audio signal or a video signal. The input unit 104 may include a Graphics Processing Unit (GPU) 1041 and a microphone 1042. The GPU 1041 processes image data of a static picture or a video that is obtained by an image acquisition apparatus (for example, a camera) in a video acquisition mode or an image acquisition mode. An image frame that has been processed may be displayed on a display unit 106. The image frame that has been processed by the GPU 1041 may be stored in the memory 109 (or another storage medium) or sent by using the radio frequency unit 101 or the network module 102. The microphone 1042 may receive a sound, and can process the sound into audio data. The processed audio data may be converted, in a phone talk mode, into a format that may be sent to a mobile communication base station via the radio frequency unit 101 for output.

The electronic device 100 further includes at least one sensor 105 such as an optical sensor, a motion sensor, and other sensors. Specifically, the optical sensor includes an ambient light sensor and a proximity sensor, where the ambient light sensor may adjust luminance of the display panel 1061 according to the luminance of the ambient light, and the proximity sensor may switch off the display panel 1061 and/or backlight when the electronic device 100 is moved to the ear. As one type of motion sensor, an acceleration sensor may detect magnitude of accelerations in various directions (generally on three axes), may detect magnitude and a direction of the gravity when static, and may be configured to recognize the attitude of the electronic device (for example, switching between landscape orientation and portrait orientation, a related game, and magnetometer attitude calibration), a function related to vibration recognition (such as a pedometer and a knock), and the like. The sensor 105 may further include a fingerprint sensor, a pressure sensor, an iris sensor, a molecular sensor, a gyroscope, a barometer, a hygrometer, a thermometer, and an infrared sensor, and the like. Details are not described herein again.

The display unit 106 is configured to display information inputted by the user or information provided to the user. The display unit 106 may include a display panel 1061, and the display panel 1061 may be configured by using a Liquid Crystal Display (LCD), an Organic Light-Emitting Diode (OLED), or the like.

The user input unit 107 may be configured to receive input digit or character information, and generate key signal input related to the user setting and function control of the electronic device. Specifically, the user input unit 107 includes a touch panel 1071 and another input device 1072. The touch panel 1071, also referred to as a touchscreen, may collect a touch operation by a user on or near the touch panel (such as an operation of a user on or near the touch panel 1071 by using any suitable object or attachment, such as a finger or a touch pen). The touch panel 1071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 110. Moreover, the touch controller receives and executes a command sent from the processor 110. In addition, the touch panel 1071 may be implemented by using various types, such as a resistive type, a capacitive type, an infrared type, and a surface acoustic wave type. In addition to the touch panel 1071, the user input unit 107 may further include the another input device 1072. Specifically, the another input device 1072 may include, but not limited to, a physical keyboard, a functional key (such as a volume control key or a switch key), a track ball, a mouse, and a joystick. Details are not described herein again.

Further, the touch panel 1071 may cover the display panel 1061. After detecting a touch operation on or near the touch panel 1071, the touch panel 1071 transfers the touch operation to the processor 110, so as to determine a type of the touch event. Then, the processor 110 provides corresponding visual output on the display panel 1061 according to the type of the touch event. Although, in FIG. 8, the touch panel 1071 and the display panel 1061 are used as two separate parts to implement input and output functions of the electronic device, in some embodiments, the touch panel 1071 and the display panel 1061 may be integrated to implement the input and output functions of the electronic device, which are not limited herein.

The interface unit 108 is an interface for connecting an external apparatus to the electronic device 100. For example, the external apparatus may include a wired or wireless headset port, an external power supply (or a battery charger) port, a wired or wireless data port, a storage card port, a port used to connect an apparatus having an identification module, an audio Input/Output (I/O) port, a video I/O port, an earphone port, and the like. The interface unit 108 may be configured to receive an input (such as data information or electric power) from an external apparatus and transmit the received input to one or more elements in the electronic device 100 or may be configured to transmit data between the electronic device 100 and an external apparatus.

The memory 109 may be configured to store a software program and various data. The memory 109 may mainly include a program storage region and a data storage region. The program storage region may store an operating system, an application program (such as a sound play function or an image play function) that is required by at least one function, and the like. The data storage region may store data (such as audio data or a phonebook) that is created according to use of the mobile phone, and the like. In addition, the memory 109 may include a high-speed random access memory, and may further include a nonvolatile memory, such as at least one magnetic disk storage device, a flash memory, or another nonvolatile solid-state storage device.

The processor 110 is a control center of the electronic device, and connects various parts of the entire electronic device by using various interfaces and lines. By running or executing a software program and/or a module stored in the memory 109, and invoking data stored in the memory 109, the processor performs various functions of the electronic device and processes data, thereby performing overall monitoring on the electronic device. The processor 110 may include one or more processing units. For example, the processor 110 may integrate an application processor and a modem processor. The application processor mainly processes an operating system, a user interface, an application program, and the like. The modem processor mainly processes wireless communication. It may be understood that the modulation and demodulation processor may not be integrated into the processor 110.

The electronic device 100 further includes a power supply 111 (such as a battery) for supplying power to the components. For example, the power supply 111 may be logically connected to the processor 110 by a power management system, thereby implementing functions such as charging, discharging, and power consumption management by using the power management system.

In addition, the electronic device 100 includes some functional modules that are not shown. Details are not described herein again.

For example, the embodiments of the present disclosure further provide an electronic device, as shown in FIG. 8, including the processor 110 and the memory 109 and a computer program stored in the memory 109 and runnable on the processor 110, where when the computer program is executed by the processor 110, various processes of the method embodiments are implemented, and the same technical effects can be achieved. To avoid repetition, details are not described herein again.

For example, the embodiments of the present disclosure further provide a non-transitory computer-readable storage medium, storing a computer program, where when the computer program is executed by a processor, various processes of the foregoing method embodiments are implemented, and the same technical effects can be achieved. To avoid repetition, details are not described herein again. The non-transitory computer-readable storage medium may include, for example, a Read-Only Memory (ROM), a Random Access Memory (RAM), a magnetic disk, or an optical disc.

It should be noted that the terms "include", "comprise", or any other variation thereof in this specification is intended to cover a non-exclusive inclusion, so that a process, a method, an article, or an apparatus that includes a series of elements not only includes those elements but also includes other elements that are not expressly listed, or further includes elements inherent to such a process, method, article, or apparatus. Without more limitations, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present application essentially or the part contributing to the prior art may be implemented in the form of a software product. The computer software product is stored in a storage medium (such as a ROM/RAM, a magnetic disk, or an optical disc) and includes several instructions for instructing an electronic device (which may be a mobile phone, a computer, a server, an air conditioner, a network device, or the like) to perform the methods described in the embodiments of the present application.

The embodiments of the present application have been described above with reference to the accompanying drawings. The present application is not limited to the specific embodiments described above, and the specific embodiments described above are merely exemplary and not limitative. Those of ordinary skill in the art may make various variations under the teaching of the present application without departing from the spirit of the present application and the protection scope of the claims, and such variations shall all fall within the protection scope of the present application.

What is claimed is:

1. An object display method, comprising:
    obtaining a second image when a first image is displayed, wherein the first image is an image acquired by a first camera, the second image is an image acquired by a second camera, each of the first image and the second image comprises a plurality of objects, the plurality of objects are images of a plurality of first physical objects, and resolution of the second image is greater than that of the first image;
    displaying a target attribute option in an interface of an application;
    determining target attribute information indicated by the target attribute option in response to a first input by a user;
    recognizing the plurality of objects in the second image according to the target attribute information to obtain M target object(s) in the second image, wherein M is a positive integer;
    displaying at least one identifier in the first image according to the M target object(s) of the second image;
    receiving a third input for a first object in the M target object(s) in the first image; and
    magnifying display of a first object in the second image in response to the third input.

2. The method according to claim 1, wherein before the obtaining a second image, the method further comprises:
    display the interface of the application, wherein the interface of the application comprises an object analysis and magnification control; and
    receiving a second input for the object analysis and magnification control;
    the displaying the target attribute option comprises:

displaying the target attribute option in response to the second input; and the obtaining a second image comprises:

obtaining the second image in response to the second input.

3. The method according to claim 1, wherein at least one physical object corresponding to the M target object(s) in the second image belongs to an attribute indicated by the target attribute information.

4. The method according to claim 1, wherein the recognizing the plurality of objects in the second image according to the target attribute information comprises:

recognizing the plurality of objects in the second image according to the target attribute information indicated by the target attribute option in response to the first input.

5. The method according to claim 1, wherein the recognizing the plurality of objects in the second image according to the target attribute information comprises:

obtaining at least one template image from a template library according to the target attribute information, wherein at least one physical object corresponding to at least one object in the at least one template image belongs to the attribute indicated by the target attribute information; and matching the second image against the at least one template image to recognize the objects in the second image.

6. The method according to claim 1, wherein the second image is an image acquired by the second camera and stored in a case that the first camera is triggered to acquire the first image.

7. The method according to claim 1, wherein a focal length of the second camera is greater than that of the first camera.

8. An electronic device, comprising:

a memory storing computer-readable instructions; and a processor coupled to the memory and configured to execute the computer-readable instructions, wherein the computer-readable instructions, when executed by the processor, cause the processor to perform operations comprising:

obtaining a second image when a first image is displayed, wherein the first image is an image acquired by a first camera, the second image is an image acquired by a second camera, each of the first image and the second image comprises a plurality of objects, the plurality of objects are images of a plurality of first physical objects, and resolution of the second image is greater than that of the first image;

displaying a target attribute option in an interface of an application;

determining target attribute information indicated by the target attribute option in response to a first input by a user;

recognizing the plurality of objects in the second image according to the target attribute information to obtain M target object(s) in the second image, wherein M is a positive integer;

displaying at least one identifier in the first image according to the M target object(s) of the second image;

receiving a third input for a first object in the M target object(s) in the first image; and magnifying display of a first object in the second image in response to the third input.

9. The electronic device according to claim 8, wherein before the obtaining a second image, the operations further comprise:

display the interface of the application, wherein the interface of the application comprises an object analysis and magnification control; and receiving a second input for the object analysis and magnification control;

the displaying the target attribute option comprises:

displaying the target attribute option in response to the second input; and the obtaining a second image comprises:

obtaining the second image in response to the second input.

10. The electronic device according to claim 8, wherein at least one physical object corresponding to the M target object(s) in the second image belongs to an attribute indicated by the target attribute information.

11. The electronic device according to claim 8, wherein the recognizing the plurality of objects in the second image according to the target attribute information comprises:

recognizing the plurality of objects in the second image according to the target attribute information indicated by the target attribute option in response to the first input.

12. The electronic device according to claim 8, wherein the recognizing the plurality of objects in the second image according to the target attribute information comprises:

obtaining at least one template image from a template library according to the target attribute information, wherein at least one physical object corresponding to at least one object in the at least one template image belongs to the attribute indicated by the target attribute information; and matching the second image against the at least one template image to recognize the objects in the second image.

13. The electronic device according to claim 8, wherein the second image is an image acquired by the second camera and stored in a case that the first camera is triggered to acquire the first image.

14. The electronic device according to claim 8, wherein a focal length of the second camera is greater than that of the first camera.

15. A non-transitory computer-readable medium, storing instructions that, when executed by a processor, cause the processor to perform operations comprising:

obtaining a second image when a first image is displayed, wherein the first image is an image acquired by a first camera, the second image is an image acquired by a second camera, each of the first image and the second image comprises a plurality of objects, the plurality of objects are images of a plurality of first physical objects, and resolution of the second image is greater than that of the first image;

displaying a target attribute option in an interface of an application;

determining target attribute information indicated by the target attribute option in response to a first input by a user;

recognizing the plurality of objects in the second image according to the target attribute information to obtain M target object(s) in the second image, wherein M is a positive integer;

displaying at least one identifier in the first image according to the M target object(s) of the second image;

receiving a third input for a first object in the M target object(s) in the first image; and magnifying display of a first object in the second image in response to the third input.

16. The non-transitory computer-readable medium according to claim 15, wherein before the obtaining a second image, the operations further comprise:

display the interface of the application, wherein the interface of the application comprises an object analysis and magnification control; and receiving a second input for the object analysis and magnification control; and the displaying the target attribute option comprises:

displaying the target attribute option in response to the second input;

the obtaining a second image comprises:

obtaining the second image in response to the second input.

17. The non-transitory computer-readable medium according to claim 15, wherein at least one physical object corresponding to the M target object(s) in the second image belongs to an attribute indicated by the target attribute information.

18. The non-transitory computer-readable medium according to claim 15, wherein the recognizing the plurality of objects in the second image according to the target attribute information comprises:

recognizing the plurality of objects in the second image according to the target attribute information indicated by the target attribute option in response to the first input.

19. The non-transitory computer-readable medium according to claim 15, wherein the recognizing the plurality of objects in the second image according to the target attribute information comprises:

obtaining at least one template image from a template library according to the target attribute information, wherein at least one physical object corresponding to at least one object in the at least one template image belongs to the attribute indicated by the target attribute information; and matching the second image against the at least one template image to recognize the objects in the second image.

20. The non-transitory computer-readable medium according to claim 15, wherein the second image is an image acquired by the second camera and stored in a case that the first camera is triggered to acquire the first image.

* * * * *